US007729956B2

(12) United States Patent
Peters

(10) Patent No.: US 7,729,956 B2
(45) Date of Patent: Jun. 1, 2010

(54) METHODS AND SYSTEM FOR DETERMINING THE USER'S INTERESTS

(75) Inventor: Johan C Peters, Bad Schoenborn (DE)

(73) Assignee: SAP AG, Walldorf (DE)

( * ) Notice: Subject to any disclaimer, the term of this patent is extended or adjusted under 35 U.S.C. 154(b) by 1189 days.

(21) Appl. No.: 11/319,507

(22) Filed: Dec. 29, 2005

(65) Prior Publication Data
US 2007/0156537 A1    Jul. 5, 2007

(51) Int. Cl.
G06F 17/30    (2006.01)
(52) U.S. Cl. ............................ 705/27; 705/26
(58) Field of Classification Search ............ 705/26, 705/27, 14
See application file for complete search history.

(56) References Cited

U.S. PATENT DOCUMENTS

| 5,799,298 | A | 8/1998 | Bingham et al. | |
| 6,055,542 | A | 4/2000 | Nielsen et al. | |
| 6,539,372 | B1 | 3/2003 | Kawasaki | |
| 2002/0004764 | A1* | 1/2002 | Stolze et al. | 705/27 |
| 2002/0035483 | A1* | 3/2002 | Patel | 705/1 |
| 2003/0231196 | A1 | 12/2003 | Keohane et al. | |
| 2004/0267723 | A1 | 12/2004 | Bharat | |
| 2007/0156537 | A1* | 7/2007 | Peters | 705/26 |

OTHER PUBLICATIONS

Oser, Kris, Facing crunch, sites zero in on targeted ads, Advertising Age, dated Oct. 10, 2005.*
Claypool et al, "Inferring user interest", IEEE Internet Computing, Nov. 2001.*

* cited by examiner

*Primary Examiner*—Mark Fadok
(74) *Attorney, Agent, or Firm*—Kenyon & Kenyon LLP

(57) ABSTRACT

The present invention provides systems and methods to allow those offering products and services, for example, via web pages, to collect accurate preferences and requirements with a minimum of effort required from a potential customer. Product information containing priority indicators is presented to a user while the user is viewing product information. By selecting a priority indicator, he user may indicate that he is interested in specific product features associated with each priority indicator. This information may then be used to construct detailed product information, quotations, demonstrations, or other material. Thus, accurate, valuable, and useful customer data may be collected without imposing on potential customers to invest a great deal of effort.

17 Claims, 8 Drawing Sheets

METHODS AND SYSTEM FOR DETERMINING THE USER'S INTERESTS

BACKGROUND

The present invention relates to systems and methods for determining a user's requirements and preferred features with respect to a product or set of products. Specifically, it relates to methods and systems for gathering this information with a minimum of effort required from the user.

Those offering high-value services and products face a problem of determining user needs and preferences. For example, a user looking to purchase software in a complex field such as customer relations management or resource management may wish to evaluate several software packages. The software packages may have a multitude of possible features and optional components, making it time-consuming for the user to determine which features, options, and benefits would most effectively meet his needs.

It is therefore difficult for one offering products or product information to determine which products or services most interest the customer, and which product features and options are required or desired. Surveys and indirect information-gathering techniques, such as inferring customer preferences from a set of web sites visited by the user, are used to gather such information. These information-gathering techniques are either unreliable (in the case of information inferred from customer actions) or burdensome on customers (in the case of surveys and similar methods). Data obtained from, e.g., surveys and request forms is also often inaccurate, since the customer is responding to questions asked out of context. For example, a customer who indicates that he places a low value on the product feature "frequent software upgrades" may not completely understand why one would want frequent updates, and therefore rank it lower than if he understood the relevant benefits. Including such information in the survey process will generally increase the time burden on users, making it less likely that they will be willing to complete the process. Similarly, asking for a complete customer profile from every visitor to a website, for example, is not feasible. Therefore a system is needed that allows for those offering products or services to easily associate product features, options, and benefits with relevant information, and provide a simple way for customers to indicate their preferences and requirements with a minimum of effort.

DETAILED DESCRIPTION

The present invention provides systems and methods to allow those offering products and services, for example, via web pages, to collect accurate preferences and requirements with a minimum of effort required from a potential customer. The invention allows information to be gathered "in context"; that is, the user will have information about the product or service available as part of the information gathering process. Product information containing priority indicators is presented to a user while the user is viewing product information. By selecting a priority indicator, the user may indicate that he is interested in specific product features associated with each priority indicator. This information may then be used to construct detailed product information, quotations, demonstrations, or other material. Thus, accurate, valuable, and useful customer data may be collected without imposing on potential customers to invest a great deal of effort.

In one embodiment of the invention, a product or informational website may contain priority indicators that allow users to indicate what product concepts, features, or benefits are important to them. As used herein, a "user" means a person that may be interested in products and services being offered, and who may make use of the product information offered. A "feature identifier" as used herein means an identifier associated with a particular feature, statement, benefit, option, or other description or attribute of a product. For example, if a list of features is stored in a database, the feature identifier may be the unique identifier of the feature. A "priority indicator" refers to a link, icon, or other object that allows a user to interact with a feature identifier. For example, a priority indicator may be an icon on a web page that a user may select to indicate that he has a need for the feature that is associated with the feature identifier represented by or connected to the priority indicator.

Figure 1:
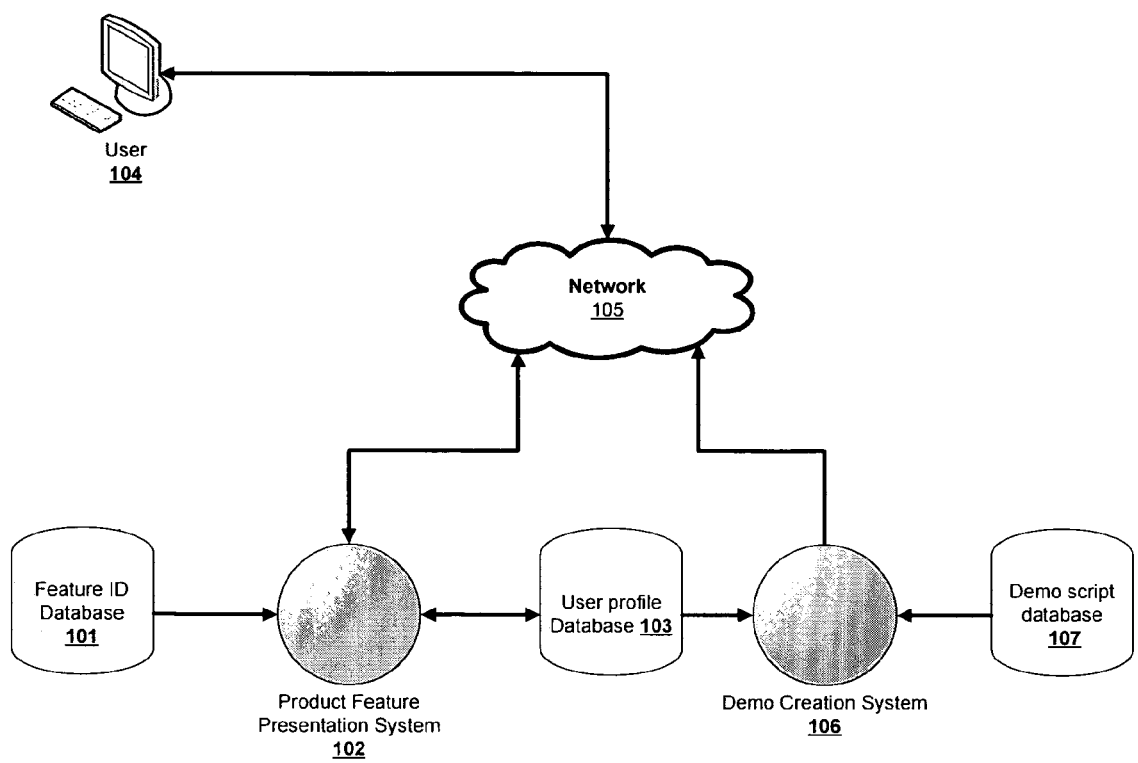
FIG. 1 is a diagram of a system according to an embodiment of the present invention.

FIG. 1 shows the basic structure of a system for collecting the preferences of a user. A product feature presentation system 102 retrieves product features and corresponding feature identifiers from feature ID database 101. The presentation system 102 may format product features and priority indicators in a variety of configurations to allow for delivery to multiple destination platforms and devices. Product information containing priority indicators may be transmitted to users via a computer network 105. When a user 104 accesses the product information containing priority indicators, he may indicate which features are beneficial, desirable, or otherwise relevant to his purchasing decision and communicate them to presentation system 102. Such information may be communicated to system 102 immediately, or it may be stored locally and transmitted at a later time, for example at the request of the user 104. The presentation system 102 may then store information regarding the preferences and selections indicated by the user 104, for example in a user profile database 103. FIG. 1 is an example arrangement of databases and servers, but other arrangements for storing and presenting product information, feature identifiers, and user preferences are possible. In some arrangements, the system will provide a way to later identifying a returning user, for example via a unique user ID.

The priority indicators may be icons on a website that are shown near a statement describing a product. When a user selects a priority indicator, the corresponding feature identifier is added to a list of preferences and requirements for that user. The website owner is then able to use this information to make recommendations tailored to the user without resorting to complex, effort-intensive methods such as surveys and detailed product customization processes. The customer's data can also be stored for use at a later date.

One use of the user profile may be to present further product information, such as a demonstration (demo) of the product or products having features selected by the user. For example, FIG. 1 shows a demo creation system 106 that may use information from the user profile database 103 to construct a demo for delivery to the user 104. The demo creation system 106 may select demo scripts or segments from a demo script database 107. The demo script database 107 may store segments of demonstrations or other product information, with each segment being associated with one of the feature identifiers stored in the feature ID database 101. Thus, for a priority indicator selected by a user 104, an entry of a feature identifier 101 may be stored in a user profile 103 and later used to create a demo using a demo script 107 associated with that feature identifier.

Figure 2:
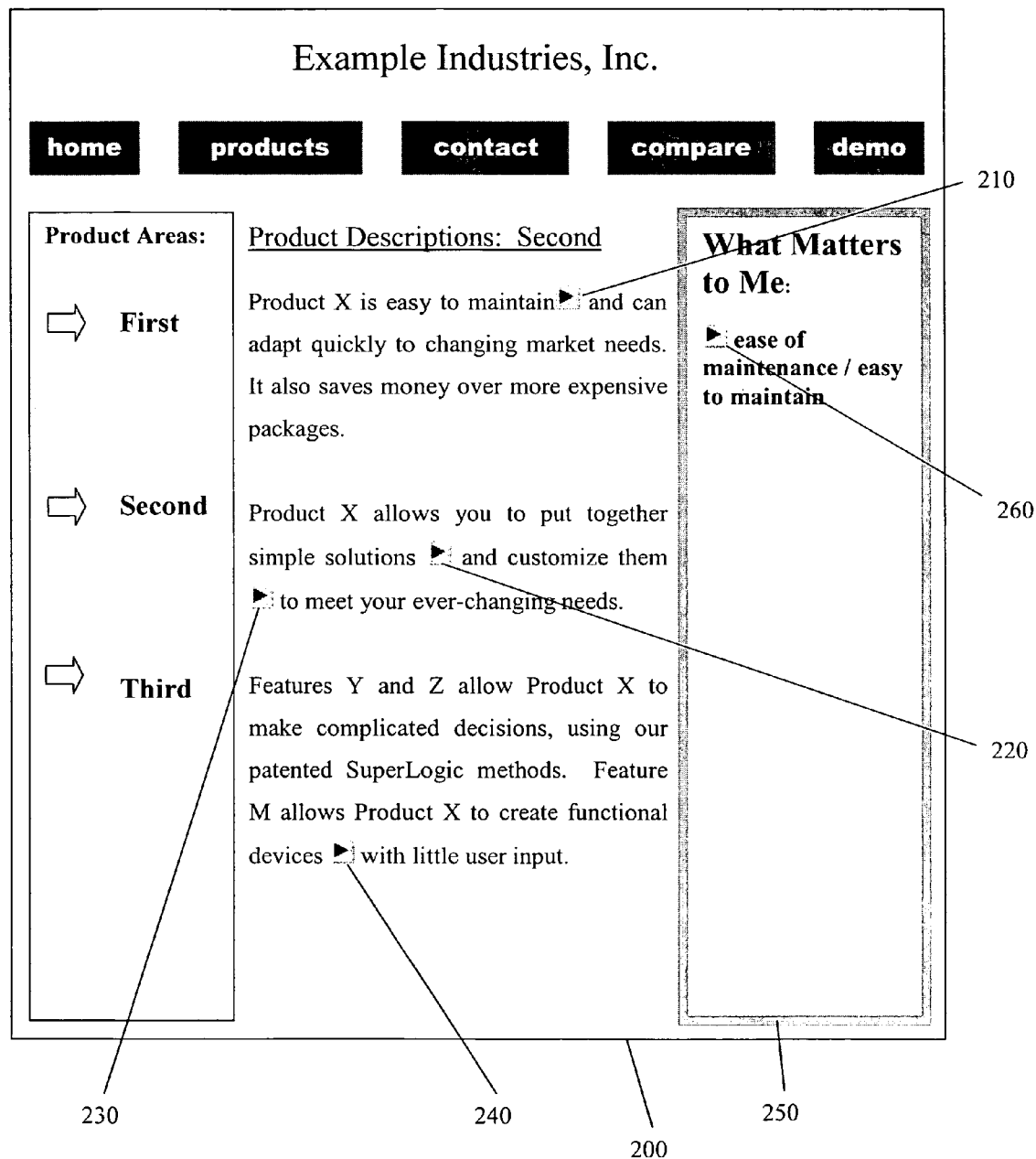
FIG. 2 is an example screenshot of a web page displaying product information according to an embodiment of the present invention.

FIG. 2 shows a sample web page that includes priority indicators among product information. The web page 200 includes priority indicators 210, 220, 230, and 240 that allow a user to indicate corresponding features or benefits that are important to him when considering the described product. By selecting one or more of the priority indicators, the user may indicate features that are of interest to him. Such selections may be shown to the user as they are made, for example by displaying the selected feature on the web page. The "What Matters to Me" list 250 displays features that have been selected as desired by the user. The list 250 may be continuously updated as the user adds entries. The web page 200 may also include a way for the user to remove items previously indicated as desirable from such a list, for example by selecting the icon 260 associated with the previously-selected feature.

As an example, FIG. 2 shows an embodiment where the user has indicated that he is interested in products that are "easy to maintain" by selecting the corresponding priority indicator 210. The priority indicator 210 may associated with the product feature "easy to maintain" in a database (not shown) or other appropriate storage medium. It may further be associated with a similar feature, for example "ease of maintenance". The statement may be visibly added to a "What Matters to Me" list 150.

Figure 3:
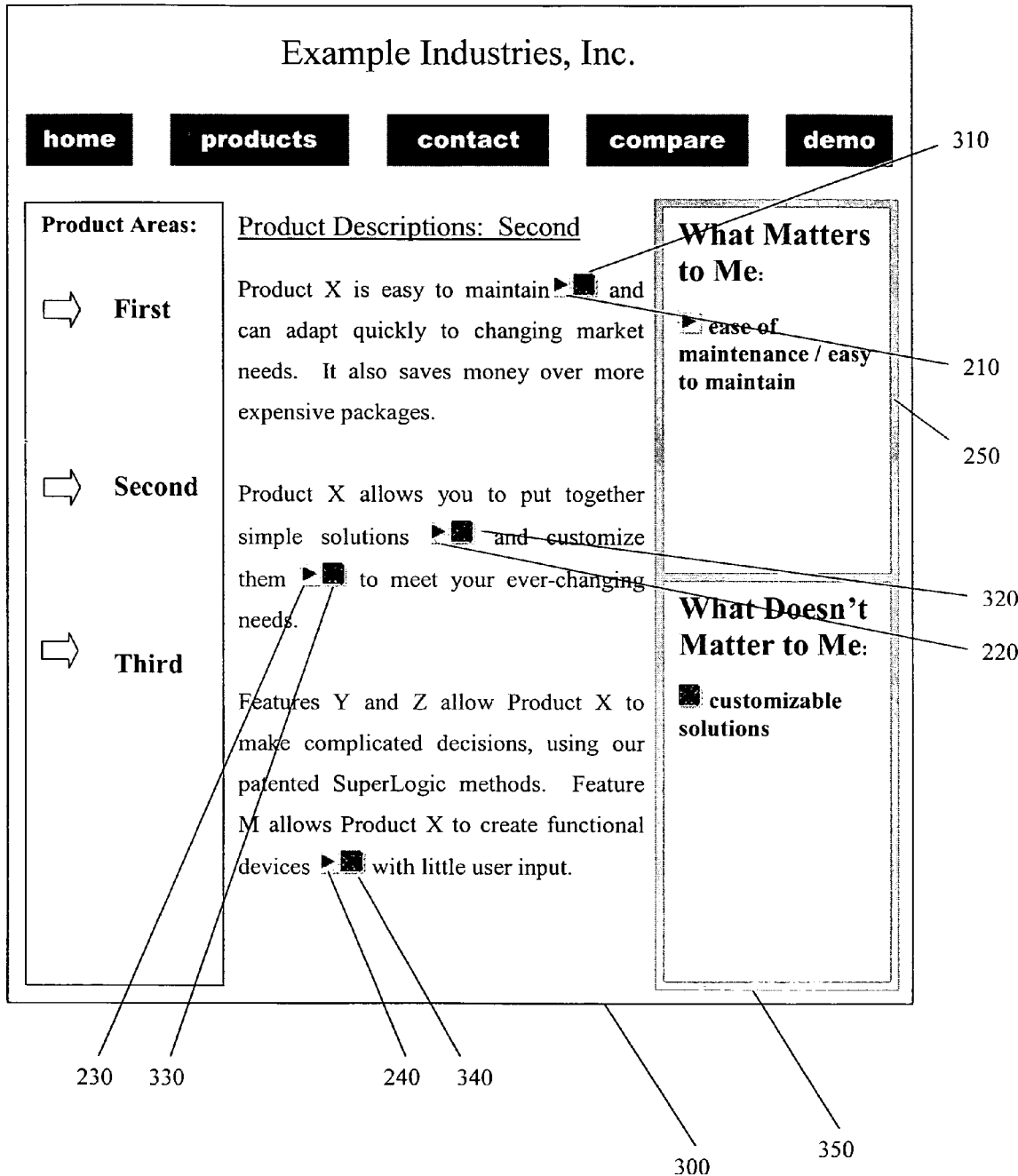
FIG. 3 is an example screenshot of a web page displaying product information according to an embodiment of the present invention.

FIG. 3 shows another website having product information displayed with priority indicators. Product information on the website 300 may contain more than one type of priority indicator. The priority indicators may be "positive" indicators 210, 220, 230, 240, or corresponding "negative" indicators 310, 320, 330, and 340, respectively. A user may select a positive priority indicator if the corresponding feature is a desired feature of the user's software needs, or a negative priority indicator if the user requires a product which does not contain the corresponding feature, or does not require the feature in a desired product. Corresponding positive and negative priority indicators may correspond to the same feature identifier. For example, positive priority indicator 210 and negative priority indicator 310 may both correspond to the product feature "easy to maintain." The system may also maintain a list of features that are required 250 and a list of features that are not required 350 for each user. These preferences may be shown to the user and stored for later use as previously described.

Figure 4:
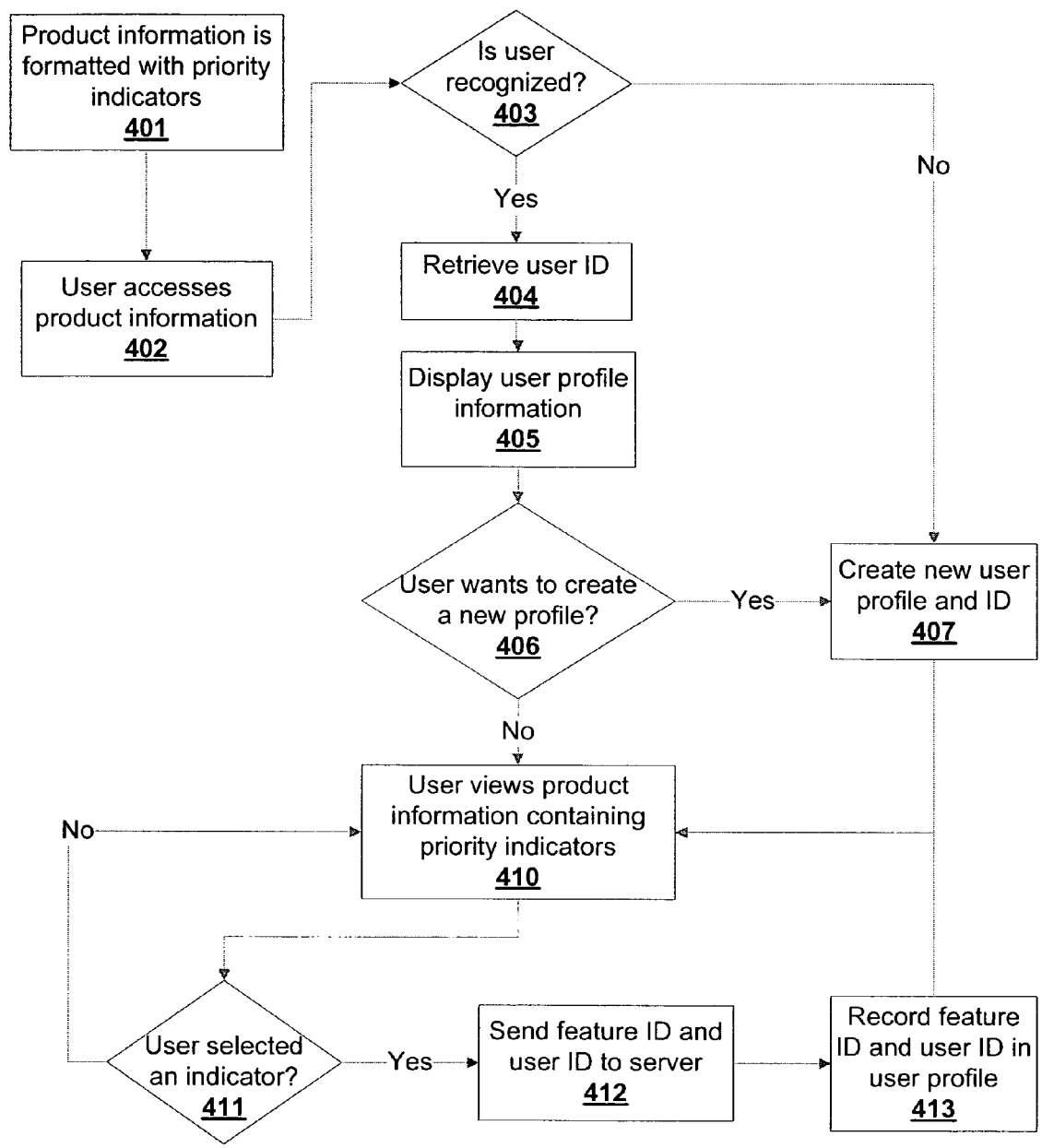
FIG. 4 is a flowchart illustrating a process for recording user preferences according to an embodiment of the present invention.

FIG. 4 is a flowchart showing one embodiment of the invention. Product information containing priority indicators 401 is made available via a web server; this information may be drawn from a database containing product information and IDs (not shown). The information contains priority indicators such as icons as described above, where each priority indicators corresponds to one or more feature identifiers. When a user first visits the site 402, the server may attempt to determine if the user is a "known" user 403. Such determination may be made, for example, by checking for the presence of a cookie or by allowing the user to log in to the site using a previously-established user name and password. A known user may be one that has previously visited the site or established an account at the site or with the owner of the site. If the user is recognized as a known user, the server may retrieve the user's previously-stored profile 404, for example by loading information including a unique user ID from a database. The system may display information about or retrieved from the user's profile 405, for example by displaying a list of product features that the user previously indicated were required for a particular purchase. The system may also allow the user to choose to use the preferences stored previously as an initial set of preferences for the current session, or to create a new profile 406. If the user is not recognized as having a previously-created profile, or if a previous user indicates that he wants to create a new profile, the system may create a profile and a unique user ID 407. The unique ID may be associated with the user, for example through the use of a cookie or other unique identifier. Each profile may have a user ID associated with it, such as a number or user login.

Once the system determines if the user is a new or returning user, the user may view product information containing priority indicators 410. If the user selects a priority indicator to indicate his preferences, the server may record a feature identifier associated with the priority indicator and the user ID as part of the user profile 413. The feature identifier and user ID may be sent from the user's client interface, for example a web browser, to a server that may store user profiles 412. The server may be, for example, a web server or a database server. The profile may be used later, for example to present product demonstrations or to provide customer information to salespeople.

Figure 5:
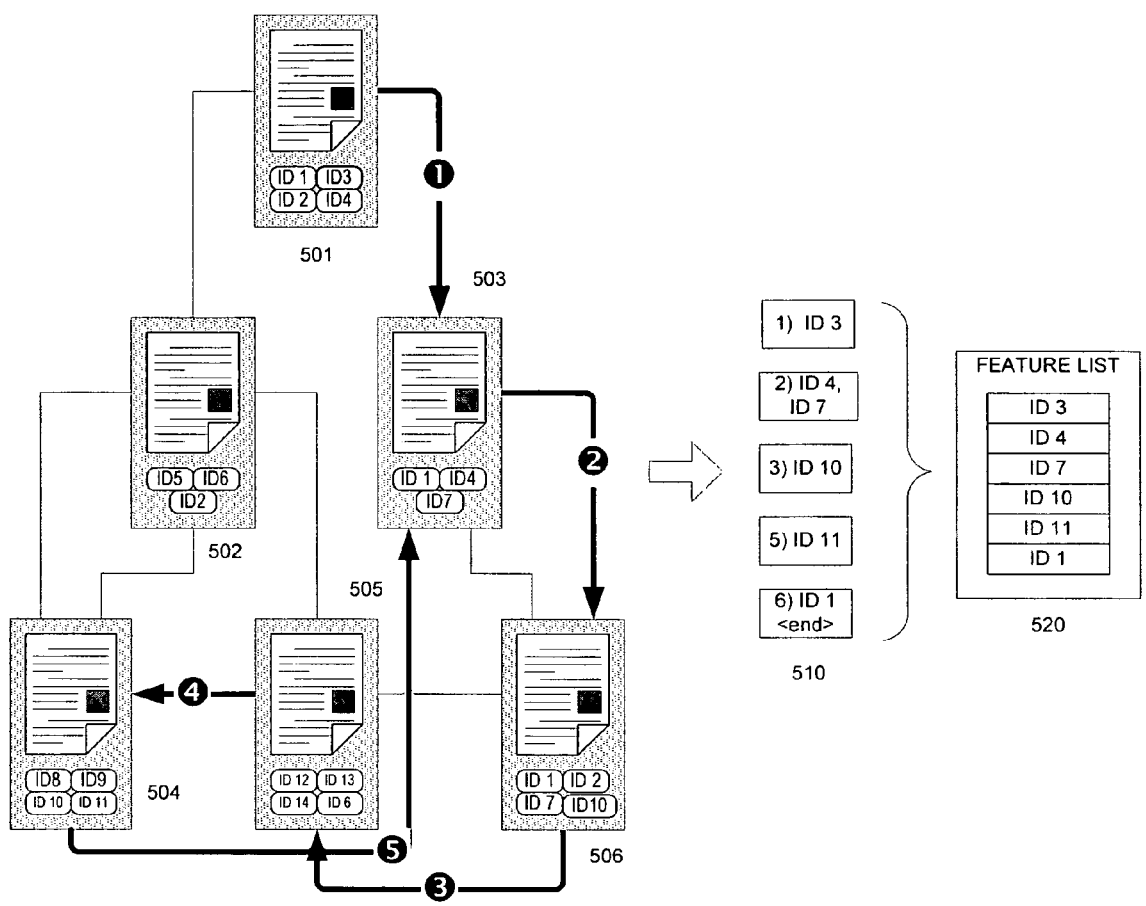
FIG. 5 is a block diagram illustrating a process of assembling a user's preferences according to an embodiment of the present invention.

FIG. 5 shows how a system may assemble a user profile based on selections of priority indicators. Product information 501-506 may contain priority indicators linked to feature identifiers, shown as ID1-ID13. The same feature identifier may be linked to multiple arrangements of product information, for example on several web pages within a site. Each occurrence of a feature identifier may be represented as a priority indicator that a user may select. As an example, ID1 appears on product information 501, 503, and 506. When a user views arrangements of product information in the order shown, he may select various priority indicators. In the example embodiment shown, the user selects a priority indicator associated with ID3 from arrangement 501, followed by ID4 and ID7 from arrangement 503, followed by ID10 from arrangement 506, followed by ID11 from arrangement 505, followed by ID11 from arrangement 504, followed by ID1 from arrangement 504. The system may record each feature identifier associated with a priority indicator selected by the user 510 for later use. The feature identifiers may be stored in an ordered list, such as a feature list 520. This may simplify the use of the information provided by the user, such as when the various features displayed as product information have been previously grouped by ID into different categories or product types.

If a user indicates that he is ready to make a purchase, request a quote, or perform similar actions, the system may use the information selected by the user to present customized product options. For example, if the user has indicated that "saving money" is important, he might be presented with more inexpensive or cost-effective options or products. He may also be given information that show how changing a previously-chosen preference will change the recommended products, thus showing how selected preferences are related to the available products and services.

A user profile may contain information other than the feature identifiers selected by the user. For example, in one embodiment the profile may record areas of the website viewed by the user. The user profile for the example given in FIG. 4 may include, for example, information indicating that the user viewed information relating to the "Second" Product Area because the user has selected the page for this product or service. The user profile may also include information inferred from the user's actions while viewing product information, such as how long a user viewed a specific type or category of information, or the order in which product information pages were viewed.

Figure 6:
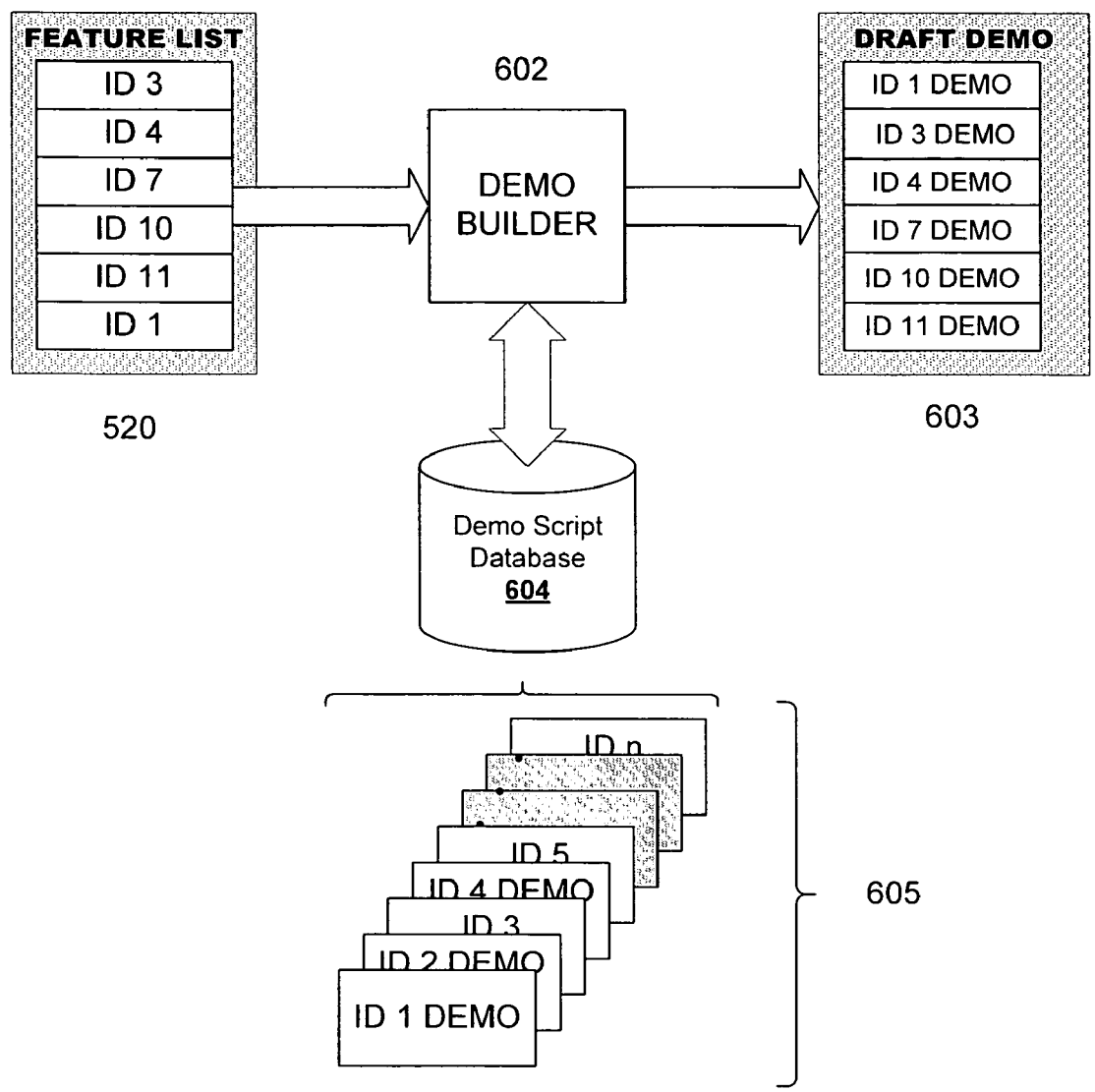
FIG. 6 is a block diagram illustrating the construction of a product demonstration according to an embodiment of the present invention.

FIG. 6 shows an example of how a feature list described with respect to FIG. 5 may be used. The system may include a set of demonstration scripts 604, where each script may relate to one of the features included in the product information and selectable by a user via a priority identifier. For example, there may be a demonstration showing or describing how a product can save money associated with the feature "lower cost of ownership." FIG. 6 shows a demo script database 604, which contains demonstrations describing or elaborating on each feature. When the demo builder 602 receives a feature list, for example after a user requests a quote on a specific product, the demo builder 602 may assemble a draft demonstration 603 by combining demos 605 associated with the feature identifiers chosen by the user 601. The draft demonstration 603 may then be shown or sent to the user, or it may be stored for later use. The demo builder 602 may arrange the demonstrations 605 corresponding to the selected IDs 601 in a particular order, or it may combine predetermined demo segments to create each demo 603. Demo scripts 605 may be tailored to the type of request may be the user. For example, if a user requests a quote, the demonstration may be a set of options and pricing based on the features the user has indicated are required. If the user requests detailed information on a specific product, the demos may show how the selected features are incorporated into the product.

The demonstrations created by the demo builder 602 may present a variety of information. For example, a demonstration may include product documentation or descriptions corresponding to features or benefits the user indicated as important by selecting priority indicators. The demonstrations may also be animations of a product or products being used or showing how a product can provide a feature, interactive demonstration versions of a product, or demonstrations illustrating features or benefits of a product. For example, the demo script database 604 may contain animations illustrating how each feature can be beneficial to a user. The demo builder 602 may select each demo script 605 that corresponds to a feature identifier in the feature list 520 constructed from a user's selection of priority indicators. The demo scripts may then be assembled into a presentation that is shown or sent to the user. Similarly, the demo script database 604 may contain documentation files 605 that the demo builder 602 assembles into product documentation that highlights those features in which the user has expressed an interest. Other types of demonstrations are possible, and different types may be combined in the demo builder to construct a multimedia demonstration or presentation. The demo script database 604 may contain small demos, each related to one or more of the feature identifiers. These small demos may be assembled by the demo builder 602 into a longer presentation. The demo builder 602 may also insert additional content to transition between the small demos.

Figure 7:
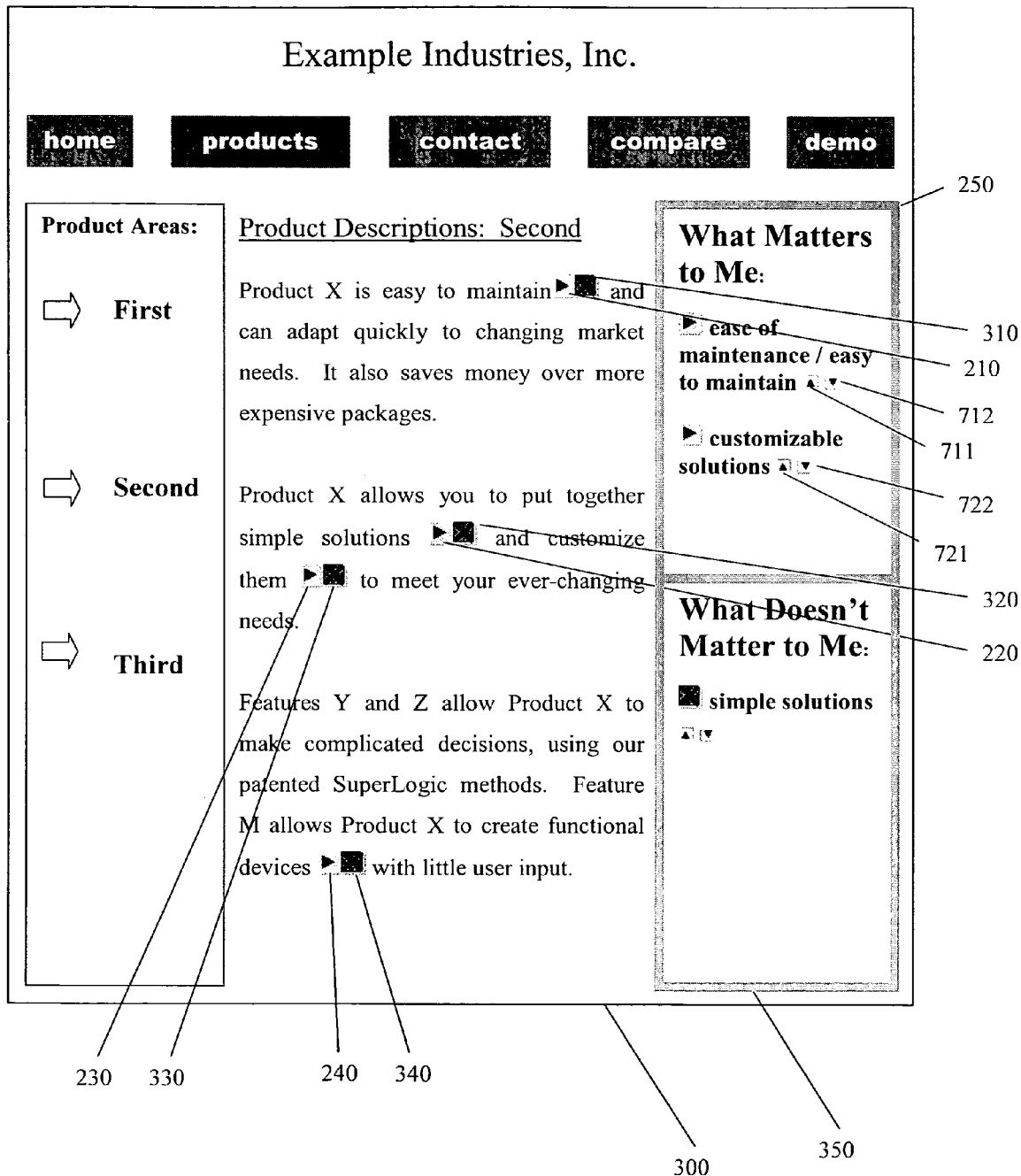
FIG. 7 is an example screenshot of a web page displaying product information according to an embodiment of the present invention.

The feature IDs in feature list 520 illustrated in FIGS. 5 and 6 may be ordered by the system after they are selected by a user. They may also be ordered by a user before or after the feature list is transmitted to the system. For example, a user may indicate which desired features have a higher priority than others. Similarly, the user may be able to order the selected features to indicate relative priority among the features selected. FIG. 7 shows an example screenshot of a web page having priority order indicators 711, 712, 721, and 722. In the example shown, a user has already added two positive priority indicators 210, 230 to the feature list 250 as previously described. Each feature has an "up" priority order indicator 711, 721, and a "down" priority indicator 712, 722. By selecting the up priority indicator associated with a feature, the user may indicate that he places a higher priority on that feature. The system may indicate such a choice, for example by moving the selected feature higher in the feature list 250. Similarly, if a user selects the down priority order indicator 712 or 722 to indicate that the corresponding feature is less important relative to another feature on the list, the feature may be moved to a lower location on the feature list. For example, in FIG. 7 a user may select the down priority order indicator 712 associated with the feature "ease of maintenance" to indicate that the feature is lower in priority than the feature "customizable solutions." The system may then store the user's priority order preferences, for example by storing the selected feature IDs in a specific order or by associating each feature ID with a priority order number, and indicate the change to the user by changing the location of each feature.

Figure 8:
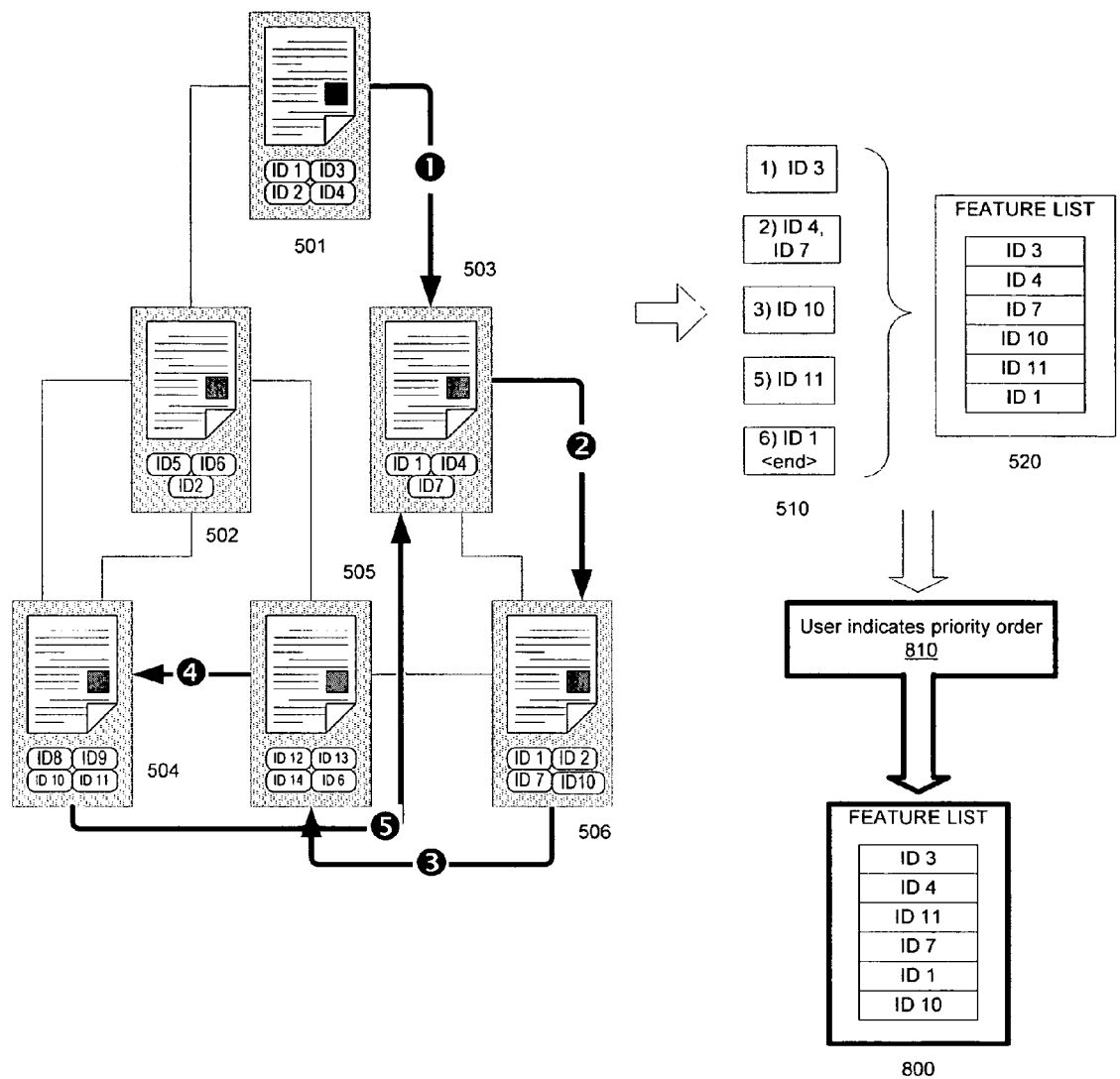
FIG. 8 is a block diagram illustrating a process of assembling a user's preferences according to an embodiment of the present invention.

FIG. 8 shows an example of a process according to an embodiment of the invention that allows a user to specify the priority order of selected features. A feature list 520 may be constructed as previously described with respect to FIG. 5. The user may then interact with priority order indicators in order to alter the relative importance of the features represented by IDs stored in the feature list 520. When the user indicates the priority order of the items stored in the feature list 810, a new feature list 800 may be created that stores an indication of this order. For example, the list may store feature IDs in a specific order as shown in FIG. 8. Similarly, the feature IDs may be stored in the same order, but with additional priority order identifiers stored in the list. That is, each feature identifier may be associated with a priority order indicator that determines the relative importance of the feature.

The priority identifiers and priority order described with respect to FIG. 8 may be stored at the time they are selected by the user, or they may be stored on the user's system and transmitted to a server at a later time such as at the conclusion of a browsing session. If the priority order of the selected features is stored on the user's system it may be transmitted in the order determined by the priority identifiers, or the feature identifiers and priority identifiers may both be transmitted to a server.

Although the present invention has been described with reference to particular examples and embodiments, it is understood that the present invention is not limited to those examples and embodiments. The present invention as claimed therefore includes variations from the specific examples and embodiments described herein, as will be apparent to one of skill in the art.

What is claimed is:

1. A computer-implemented method for supporting product sales, comprising:

transferring pages of product information content, by a server, to a browser on a client terminal during a browsing session, various pages including content with user-selectable priority indicators interspersed therein, wherein the priority indicators are graphical identifiers related to content presented by the browser;

storing identifiers of selected priority indicators and a feature identifier in a feature list associated with an user identifier in response to a user interaction with priority indicators on the server;

in response to a user input to alter the feature list, assigning a priority order to a priority indicator in the feature list based on the user input;

at the conclusion of a product browsing operation at the client terminal, receiving the feature list including the identifiers of selected priority indicators and the feature identifier at the server;

assembling a data file from product demonstration segments stored in a database at the server, the product demonstration segments being indexed according to the identifiers of the selected priority indicators and the feature identifier; and returning the data file to the client based on the user identifier for presentation to a user.

2. The method of claim 1 wherein the priority indicators are embedded within textual descriptions on rendered pages.

3. The method of claim 1 wherein the product information segments are product documentation.

4. The method of claim 1 wherein the product information segments are product animations.

5. The method of claim 1 wherein the product information segments are product demonstrations.

6. The method of claim 1 further comprising the step of storing the feature list.

7. The method of claim 1 further comprising the step of in response to a user interaction with a priority order indicator, assigning a priority order to a priority indicator in the feature list.

8. The method of claim 1,
wherein the assembling comprises:
combining the product demonstration segments into a single presentation stored in the data file.

9. The method of claim 8 wherein the step of combining the product demonstration segments comprises inserting transitions between each product demonstration segment.

10. A system comprising:

a database storing a set of product demonstration segments, each product demonstration segment being associated with one or more feature identifiers;

a server executing a demo builder computer application configured to select product demonstration segments from the database corresponding to feature identifiers assembled from user interactions recorded during a browsing session, and assemble the selected product demonstration segments into a presentation according to a priority associated with the feature identifiers assembled from the user interactions recorded during the browser session, the associated priority being altered by a user input assigning a priority to the feature identifiers during the browser session; and a user terminal for altering the priority associated with the feature identifiers and for outputting the presentation.

11. The system of claim 10, the database further comprising stored transitions, wherein the demo builder is further configured to insert transitions between one or more product demonstration segments when assembling the presentation.

12. The system of claim 10, wherein the product demonstration segments comprise product documentation.

13. The system of claim 10, wherein the product demonstration segments comprise product animations.

14. The system of claim 10, wherein the product demonstration segments comprise product demonstrations.

15. The system of claim 10, further comprising a user profile database to store user profiles, wherein the feature identifiers are stored in the user profiles.

16. A machine-readable medium containing program instructions for execution on a processor, which when executed by the processor, cause the processor to perform:

inserting priority indicators into product information content;

transferring various pages of product information content containing priority indicators to a browser on a client terminal during a browsing session, the various pages including content with user-selectable priority indicators interspersed therein, wherein the priority indicators are graphical identifiers related to content presented by the browser;

storing identifiers of selected priority indicators and a feature identifier in a feature list associated with an user identifier in response to a user interaction with priority indicators on a server; at the conclusion of a product browsing operation at the client terminal, receiving the feature list including the identifiers of selected priority indicators and the feature identifier at the server;

in response to a user input to alter the feature list, assigning a priority order to a priority indicator in the feature list based on the user input;

assembling a data file from product demonstration segments stored in a database at the server, the product demonstration segments being indexed according to the identifiers of the selected priority indicators and the feature identifier; and returning the data file to the client based on the user identifier for presentation to a user.

17. The machine-readable medium of claim 16, further comprising generating a data file from product information segments stored in a database, the product information segments being indexed by the identifiers of the selected priority indicators.

* * * * *